(12) United States Patent
Pan et al.

(10) Patent No.: US 11,618,700 B1
(45) Date of Patent: Apr. 4, 2023

(54) RECYCLING PURIFICATION AND REUSE SYSTEM FOR FARMLAND TAIL WATER

(71) Applicants: INSTITUTE OF AGRICULTURAL RESOURCES AND REGIONAL PLANNING, CHINESE ACADEMY OF AGRICULTURAL SCIENCES, Beijing (CN); AGRO-ENVIRONMENTAL PROTECTION INSTITUTE, MINISTRY OF AGRICULTURE AND RURAL AFFAIRS, Tianjin (CN)

(72) Inventors: Junting Pan, Beijing (CN); Guilong Zhang, Tianjin (CN); Cheng Yan, Beijing (CN); Hongbin Liu, Beijing (CN); Jie Li, Tianjin (CN); Limei Zhai, Beijing (CN); Bin Xi, Beijing (CN); Jianning Zhao, Tianjin (CN); Lili Wang, Tianjin (CN); Weiming Xiu, Tianjin (CN); Yanjun Zhang, Tianjin (CN)

(73) Assignees: INSTITUTE OF AGRICULTURAL RESOURCES AND REGIONAL PLANNING, CHINESE ACADEMY OF AGRICULTURAL SCIENCES, Beijing (CN); AGRO-ENVIRONMENTAL PROTECTION INSTITUTE, MINISTRY OF AGRICULTURE AND RURAL AFFAIRS, Tianjin (CN)

( * ) Notice: Subject to any disclaimer, the term of this patent is extended or adjusted under 35 U.S.C. 154(b) by 0 days.

(21) Appl. No.: 17/817,344

(22) Filed: Aug. 3, 2022

(30) Foreign Application Priority Data

Nov. 30, 2021 (CN) .......................... 202111441240.1

(51) Int. Cl.
*C02F 3/30* (2023.01)
*C02F 1/00* (2023.01)

(52) U.S. Cl.
CPC .............. *C02F 3/308* (2013.01); *C02F 1/001* (2013.01); *C02F 2303/14* (2013.01)

(58) Field of Classification Search
CPC ....... C02F 3/308; C02F 1/001; C02F 2303/14
(Continued)

(56) References Cited

FOREIGN PATENT DOCUMENTS

CN 106178667 B * 10/2018
CN 108782133 A 11/2018
(Continued)

OTHER PUBLICATIONS

Machine-generated English translation of CN 106178667 B, generated on Nov. 10, 2022.*
(Continued)

*Primary Examiner* — Fred Prince
(74) *Attorney, Agent, or Firm* — Metis IP LLC (57) ABSTRACT

Disclosed is a recycling purification and reuse system for farmland tail water, which includes a water collecting pool, a water purifying pool and a clean water pool; the water purifying pool is correspondingly arranged with the clean water pool; the water collecting pool is located above the side of the water purifying pool far away from the clean water pool; one side of the water collecting pool close to the water purifying pool is provided with an opening; the opening is provided with a filtering mechanism; the filtering mechanism is correspondingly arranged with the water purifying pool; a water pumping mechanism is arranged in the water purifying pool; and the water outlet end of the pumping mechanism is correspondingly arranged with the clean water pool.

8 Claims, 9 Drawing Sheets

(58) Field of Classification Search
USPC .................. 210/605, 614, 630, 903, 906
See application file for complete search history.

(56) References Cited

FOREIGN PATENT DOCUMENTS

| | | |
|---|---|---|
| CN | 212864484 U | 4/2021 |
| CN | 113217465 A | 8/2021 |
| GB | 707410 A | 4/1954 |

OTHER PUBLICATIONS

First Office Action in Chinese Application No. 202111441240.1 dated Feb. 28, 2022, 9 pages.
Decision to Grant a Patent in Chinese Application No. 202111441240.1 dated Apr. 15, 2022, 4 pages.

\* cited by examiner

RECYCLING PURIFICATION AND REUSE SYSTEM FOR FARMLAND TAIL WATER

CROSS-REFERENCE TO RELATED APPLICATIONS

This application claims priority to Chinese Patent Application No. 202111441240.1, filed on Nov. 30, 2021, the contents of which are hereby incorporated by reference.

TECHNICAL FIELD

This disclosure relates to the technical field of agricultural water source pollution control, and in particular to a recycling purification and reuse system for farmland tail water.

BACKGROUND

Agricultural water consumption accounts for more than 50% of the total water consumption. With the acceleration of industrial and agricultural production and urbanization, the proportions of industrial and domestic water consumption have increased dramatically, and the contradiction of water use has become increasingly prominent. In order to alleviate the shortage of urban water, agricultural water has to give way to urban water, which further reduces the proportion of agricultural water consumption. Meanwhile, farmland tail water has not been fully recycled, which further aggravates the shortage of water resources.

Farmland tail water contains pesticides and abundant nitrogen and phosphorus. Generally, the existing farmland tail water is directly discharged, which easily leads to water pollution caused by nitrogen, phosphorus, pesticides, and other substances in the tail water. The existing farmland tail water treatment system cannot fully recycle the farmland tail water, and results in the loss of nutrients such as nitrogen and phosphorus in the tail water.

SUMMARY

The objective of this disclosure is to provide a recycling purification and reuse system for farmland tail water so as to solve the above problems existing in the prior art.

To achieve the above objective, this disclosure provides the following solutions: a recycling purification and reuse system for farmland tail water, including a water collecting pool, a water purifying pool and a clean water pool; the water purifying pool is correspondingly arranged with the clean water pool; the water collecting pool is located above a side of the water purifying pool far away from the clean water pool; one side of the water collecting pool close to the water purifying pool is provided with an opening; a filtering mechanism is arranged on the opening, and the filtering mechanism is correspondingly arranged with the water purifying pool; a water pumping mechanism is arranged in the water purifying pool; and the water outlet end of the water pumping mechanism is correspondingly arranged with the clean water pool.

Optionally, the filtering mechanism includes mounting blocks fixedly connected to two side walls of the opening; a first semi-cylindrical plate is arranged between the two mounting blocks; two sides of the first semi-cylindrical plate are fixedly connected with two mounting blocks respectively; a mounting shaft is rotatably connected between the two mounting blocks; the mounting shaft is coaxially arranged with the first semi-cylindrical plate, and the first semi-cylindrical plate is rotationally connected with the mounting shaft; the mounting shaft is fixedly connected with a second semi-cylindrical plate; the second semi-cylindrical plate is coaxially arranged with the mounting shaft; an outer wall of the second semi-cylindrical plate is in sliding fit with an inner wall of the first semi-cylindrical plate; side walls of the first semi-cylindrical plate and the second semi-cylindrical plate are both provided with a plurality of rows of through holes along an axial direction; two ends of the mounting shaft penetrate through the mounting block and a side wall of the water collecting pool and extend out of the water collecting pool; an outer side wall of that water collecting pool is provided with a driving assembly; and the driving assembly is matched with the mounting shaft in a transmission way.

Optionally, the driving assembly includes a mounting frame fixedly connected with an outer wall of the water collecting pool; a driving motor is fixedly connected in the mounting frame; an output shaft of the driving motor is fixedly connected with a driving gear; both ends of the mounting shaft are fixedly connected with driven gears; and the driving gear is meshed with the driven gears.

Optionally, the water pumping mechanism includes an mounting box fixedly connected to an inner wall of the water purifying pool; a driving part is arranged in the mounting box; a partition in horizontal direction is fixedly connected to one side of the mounting box far from the driving part; the partition divides the mounting box into two slideways; a push plate is slidably connected in the two slideways; one side of the two push plate is fixedly connected with a push rod; the push rod is in transmission connection with the driving part; two elastic membranes are arranged in the mounting box at one side away from the driving part; the two elastic membranes are respectively fixedly connected with an inner wall of the mounting box and a side wall of the partition far away from the driving part; a closed compression chamber is formed between the elastic membrane and the partition; one side of the mounting box close to the elastic membrane is fixedly connected with a stopper; a gap is arranged between the elastic membrane and the stopper; top and bottom parts of the mounting box near the stopper are respectively provided with a water outlet and a water inlet; top and bottom ends of the outer wall of the mounting box are respectively and fixedly connected with a water outlet pipe and a water inlet pipe; and the water outlet pipe and the water inlet pipe are respectively communicated with the water outlet and the water inlet.

Optionally, the driving part includes a reciprocating motor fixedly connected to a top part of the outer wall of the mounting box; a stepped shaft is fixedly connected in the mounting box; a middle part of the mounting plate is rotatably connected to the stepped shaft; the top and bottom ends of the mounting plate are provided with long holes; one end of the push rod far away from the push plate is fixedly connected with a connecting rod; the connecting rod is slidably connected in the long hole; the stepped shaft is rotatably connected with a first sprocket; an output shaft of the reciprocating motor is fixedly connected with a second sprocket; the first sprocket and the second sprocket are in transmission connection through a chain; and a side wall of the first sprocket is fixedly connected with the side wall of the mounting plate.

Optionally, an inner wall of one end of the water inlet pipe far from the mounting box is detachably connected with a filter screen; one end of the water inlet pipe close to the filter screen is provided with a cleaning assembly; and the cleaning assembly is correspondingly arranged with the filter screen.

Optionally, the cleaning assembly includes a sleeve with one end sleeved on the water inlet pipe; an inner wall of the water inlet pipe close to one end of the filter screen is circumferentially and fixedly connected with one end of a plurality of support rods; other end of the support rod is fixedly connected with an outer wall of a bearing; an inner wall of that bearing is fixedly connected with one end of a fixing rod; the fixing rod is coaxially arranged with the water inlet pipe; other end of the fixing rod penetrates through the filter screen and extends out of the water inlet pipe; one end of the fixing rod extending out of the filter screen is fixedly connected with an impeller; and the impeller is spaced from an inner wall of the sleeve.

Optionally, an orifice plate is slidably connected in the water collecting pool; a bottom of the orifice plate is fixedly connected with an output end of a hydraulic telescopic rod; a fixed end of the hydraulic telescopic rod is fixedly connected with a bottom of the water collecting pool; and a gap is arranged between a top surface of the orifice plate and an outer wall of the second semi-cylindrical plate.

Optionally, two opposite side walls of the water collecting pool are provided with slide rails; and the orifice plate is slidably connected in the water collecting pool through the slide rails.

Optionally, the water purifying pool includes a first treatment pool and a second treatment pool; the first treatment pool is an anaerobic pool; the second treatment pool is an aerobic pool; the first treatment pool receives water from the water collecting pool; the first treatment pool performs anaerobic treatment on the water from the water collecting pool, then discharging to the second treatment pool; the second treatment pool receives water from the first treatment pool; and the second treatment pool performs aerobic treatment on the water from the first treatment pool, then discharging to the clean water pool.

Optionally, the system further includes a controller, and the controller is used for determining a target illumination distribution matrix; and controlling the recycling purification and reuse system to adjust accordingly based on the target illumination distribution matrix.

Optionally, determining the target illumination distribution matrix includes determining the target illumination distribution matrix based on genetic algorithm.

One or more embodiment of this disclosure provides a method for recycling purification and reuse of farmland tail water, which is executed by a controller, including determining a target illumination distribution matrix; and controlling the recycling purification and reuse system to adjust accordingly based on the target illumination distribution matrix.

One or more embodiment of this disclosure provides a computer-readable storage medium, wherein the storage medium stores computer instructions, and after the computer reads the computer instructions in the storage medium, the computer runs the recycling purification and reuse method for farmland tail water according to claim 13.

This disclosure discloses the following technical effects: the water collecting pool is used to collect farmland tail water. There is a lot of suspended garbage in the collected tail water, and the suspended garbage is filtered out by a filtering mechanism, and the filtered tail water enters a water purifying pool for purification, and the tail water is purified by biodegradation in the water purifying pool; after purification, the upper layer of the water purifying pool is purified water, which is pumped into the clean water pool by a pumping mechanism. After fermentation, the bottom sludge containing a large amount of nitrogen and phosphorus elements may be backfilled to the farmland to supplement agricultural fertilizer nutrients, thus realizing the full recycling of farmland tail water. In other embodiments of this disclosure, by dividing the water purifying pool into the first treatment pool and the second treatment pool, the anaerobic treatment and the aerobic treatment may be carried out in separate pools, so that the water purification treatment is more sufficient, thus improving the tail water purification effect. Further, by determining the target illumination distribution matrix, the control system may make corresponding adjustments in corresponding time periods, and the tail water purification efficiency may be improved.

BRIEF DESCRIPTION OF THE DRAWINGS

In order to more clearly explain some embodiments of this disclosure or the technical solutions in the prior art, the following will briefly introduce the drawings that need to be used in the embodiments. Obviously, the drawings in the following description are only some embodiments of this disclosure. For those of ordinary skill in this field, other drawings may be obtained according to these drawings without paying creative labor.

DETAILED DESCRIPTION OF THE EMBODIMENTS

The technical solutions in some embodiments of this disclosure will be clearly and completely described below with reference to the drawings in some embodiments of this disclosure. Obviously, the described embodiments are only part of the embodiments of this disclosure, but not all of them. Based on the embodiments in this disclosure, all other embodiments obtained by ordinary technicians in this field without creative labor belong to the scope of protection in this disclosure.

In order to make the above objects, features and advantages of this disclosure more obvious and understandable, the following description will be made in further detail with reference to the drawings and detailed description.

Figure 1:
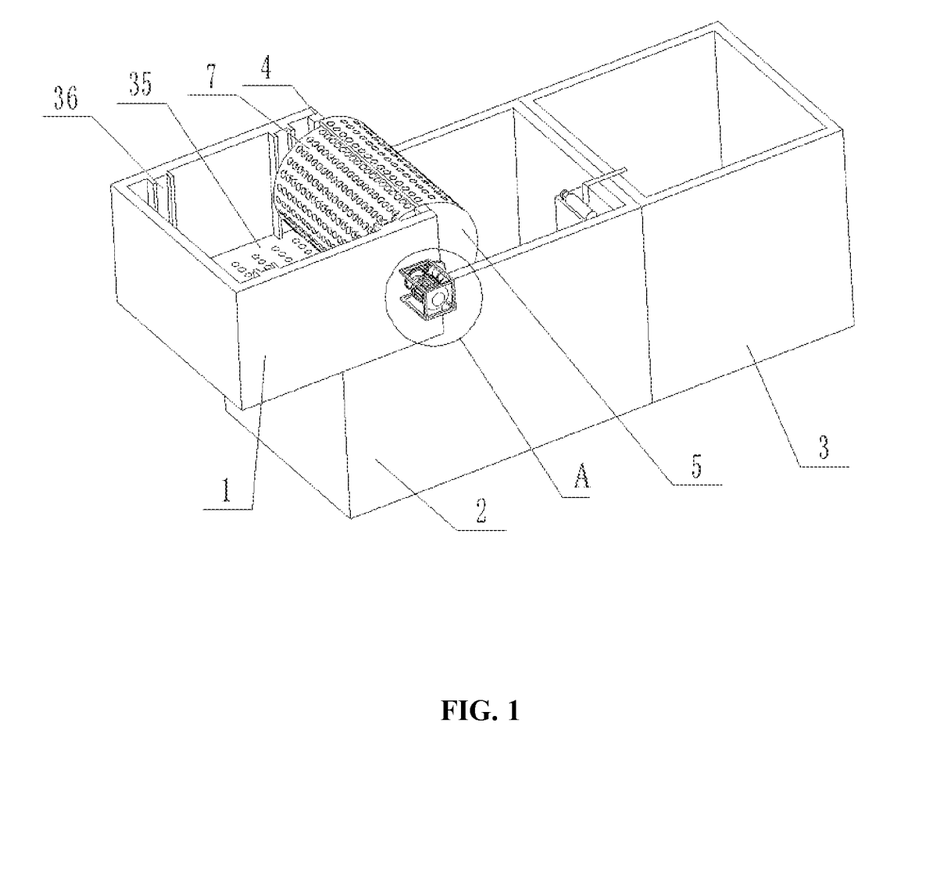
FIG. 1 is an isometric view of a recycling purification and reuse system (filtration state) for farmland tail water shown in some embodiments of this disclosure.
Figure 2:
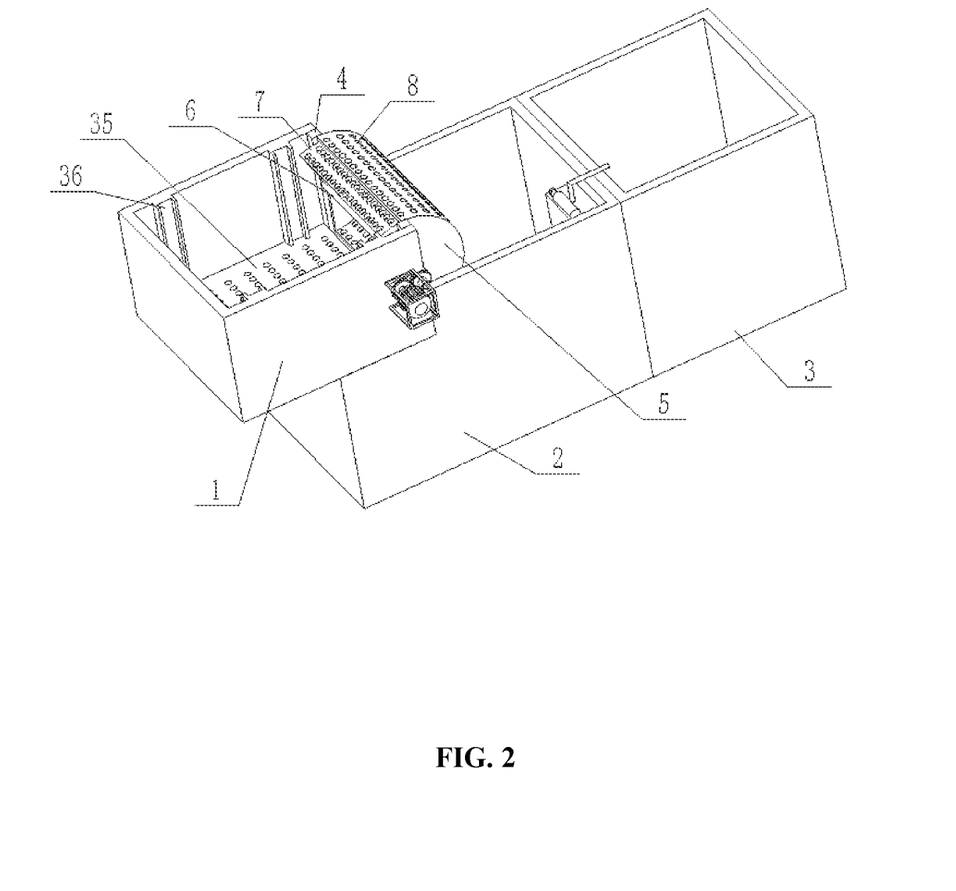
FIG. 2 is an isometric view of a recycling purification and reuse system (conventional state) for farmland tail water shown in some embodiments of this disclosure.

This disclosure provides a recycling purification and reuse system for farmland tail water, which includes a water collecting pool 1, a water purifying pool 2 and a clean water pool 3; the water purifying pool 2 corresponds to the water purifying pool 3, and the water collecting pool 1 is located above the side of the water purifying pool 2 far away from the clean water pool 3; one side of the water collecting pool 1 close to the water purifying pool 2 is provided with an opening, and a filtering mechanism is installed on the opening; the filtering mechanism is correspondingly arranged with the water purifying pool 2; a water pumping mechanism is arranged in the water purifying pool 2; and a water outlet end of the pumping mechanism is correspondingly arranged with the clean water pool 3.

Figure 8:
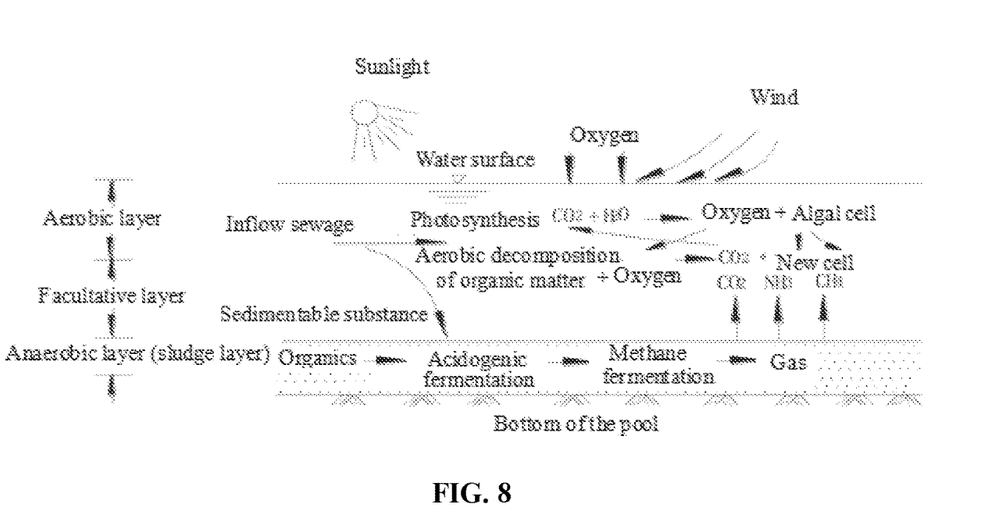
FIG. 8 is a biodegradation diagram in a water purifying pool shown in some embodiments of this disclosure.

With reference to the FIG. 8 of the disclosure, the water collecting pool 1 is used for collecting the tail water of farmland; there are a lot of suspended garbage in the collected tail water, and the suspended garbage is filtered out by a filtering mechanism; the filtered tail water enters the water purifying pool 2 for purification, and the depth of the water purifying pool 2 is 1.0-2.0 m; in the upper layer of the pool, the part where sunlight may penetrate is an aerobic zone, and the changes of various indexes and biochemical reactions produced by the aerobic zone are the same as those of the aerobic pool. Aerobic-heterotrophic microorganisms oxidize and decompose organic matter, and the photosynthesis of algae is vigorous, releasing a lot of oxygen. At the bottom of the pool, the sludge area is formed by the precipitated sludge and decaying algae and fungi. Because of the lack of oxygen, anaerobic fermentation is carried out in this layer, which is called anaerobic layer. Between the aerobic layer and the anaerobic layer, there is a facultative layer. In this layer, the content of dissolved oxygen is very low and sometimes absent. Generally, dissolved oxygen exists in the daytime, but it is in an anaerobic state at night. In this layer, facultative microorganisms survive, which may not only use the free molecular oxygen in water, but also take in oxygen from $NO_3^-$ or $CO_3^{2-}$ under anaerobic conditions. Further, tail water purification is realized. The upper layer of the water purifying pool 2 is purified water, which is pumped into the clean water pool 3 by a pumping mechanism. After fermentation, the bottom sludge containing a large amount of nitrogen and phosphorus elements may be refilled to the farmland to supplement agricultural fertilizer nutrients.

Figure 4:
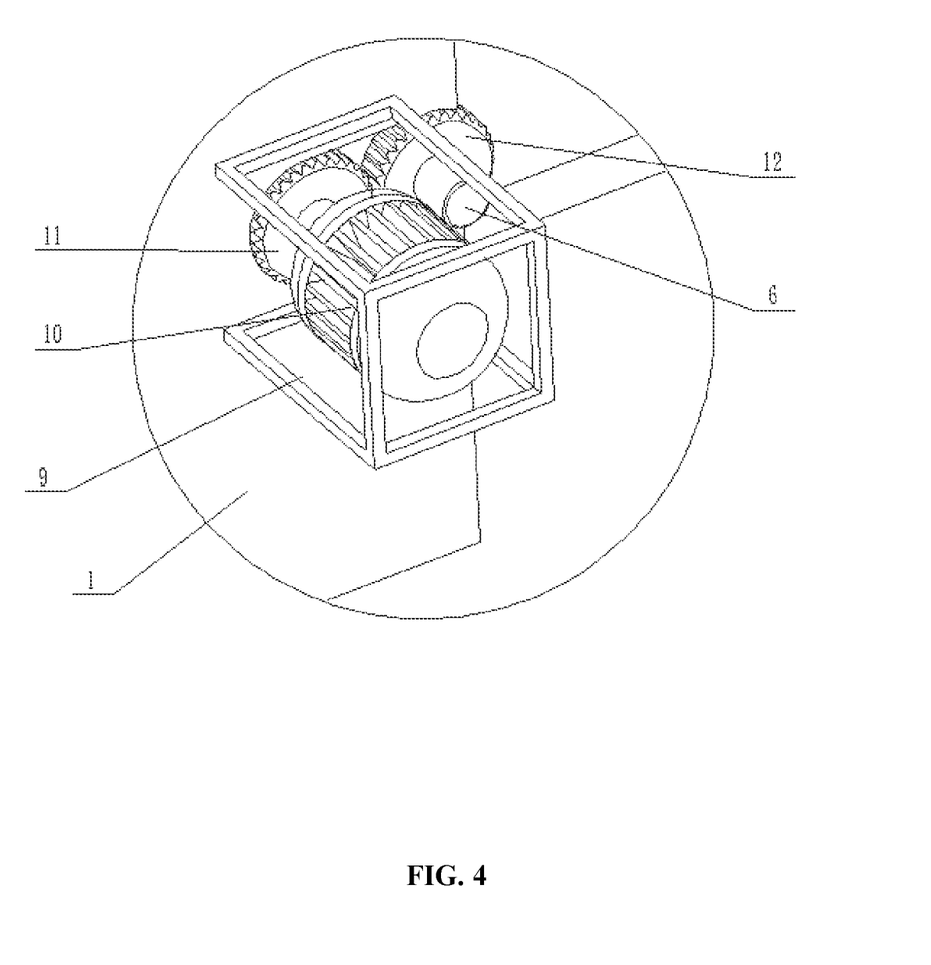
FIG. 4 is an enlarged view of A in FIG. 1.
Figure 5:
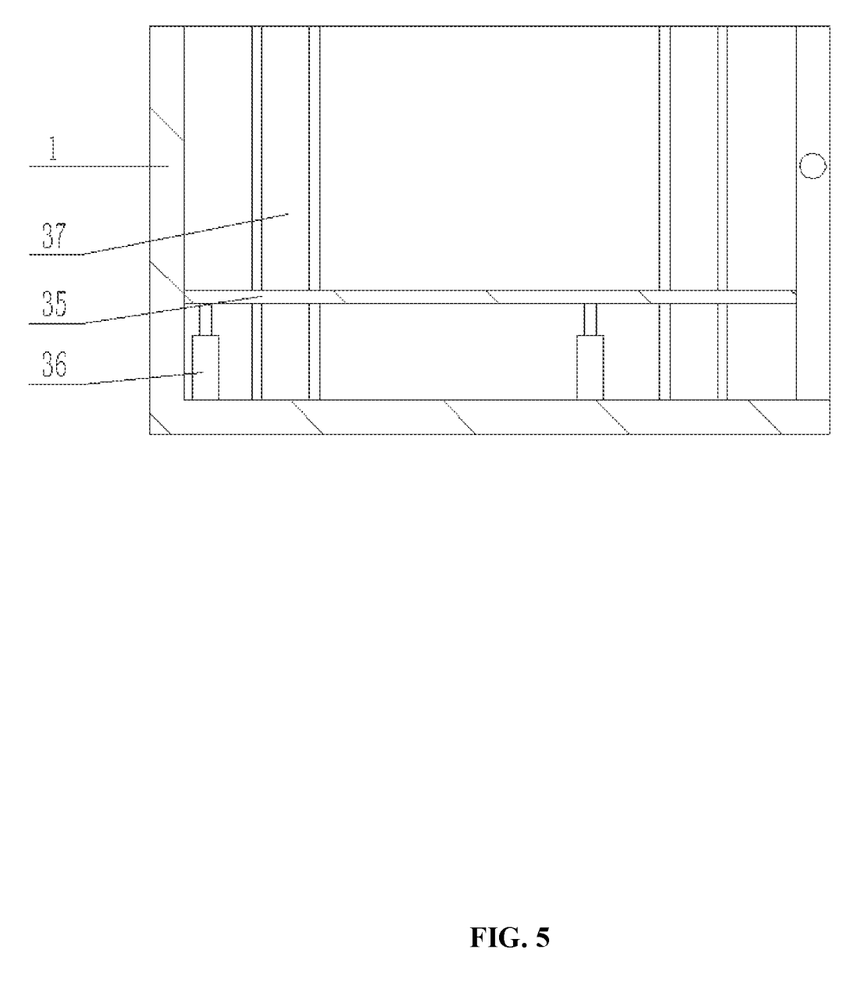
FIG. 5 is a cross-sectional view of the front view of the water collecting pool shown in some embodiments of this disclosure.

Further, in order to separate the suspended impurities from the fertilizer water in the farmland, a filtering mechanism is provided, which includes mounting blocks 4 fixedly connected to two side walls of the opening; a first semi-cylindrical plate 5 is arranged between the two mounting blocks 4; two sides of the first semi-cylindrical plate 5 are fixedly connected with the two mounting blocks 4 respectively; a mounting shaft 6 is rotatably connected between the two mounting blocks 4; the mounting shaft 6 is coaxially arranged with the first semi-cylindrical plate 5, and the first semi-cylindrical plate 5 is rotationally connected with the mounting shaft 6; the mounting shaft 6 is fixedly connected with a second semi-cylindrical plate 7 which is coaxially arranged with the mounting shaft 6; an outer wall of the second semi-cylindrical plate 7 is in sliding fit with an inner wall of the first semi-cylindrical plate 5; the side walls of the first semi-cylindrical plate 5 and the second semi-cylindrical plate 7 are provided with a plurality of rows of through holes 8 along the axial direction; two ends of the mounting shaft 6 penetrate through the mounting block 4 and the side wall of the water collecting pool 1 and extend out of the water collecting pool 1; a driving assembly is mounted on the outer side wall of the water collecting pool 1, and the driving assembly is matched with the mounting shaft 6 in a driving manner.

With reference to the FIG. 2 of the disclosure, a cylindrical shape is formed between the second semi-cylindrical plate 7 and the first semi-cylindrical plate 5 in the working process; the fertilizer water received in the water collecting pool 1 flows out into the water purifying pool 2 through the through holes 8 on the second semi-cylindrical plate 7 and the first semi-cylindrical plate 5; when the amount of water in the water purifying pool 2 is high, the inner wall of the first semi-cylindrical plate 5 is in contact with the outer wall of the second semi-cylindrical plate 7, and the inner wall of the first semi-cylindrical plate 5 is staggered with the through hole 8 on the side wall of the second semi-cylindrical plate 7, so as to achieve sealing; meanwhile, when a lot of garbage is attached to the outer wall of the second semi-cylindrical plate 7, the second semi-cylindrical plate 7 is driven to rotate by the driving assembly, and the first semi-cylindrical plate 5 and the second semi-cylindrical plate 7 are used as scrapers to scrape off the garbage on the outer wall of the second semi-cylindrical plate 7 and the garbage attached to the inner wall of the first semi-cylindrical plate 5 during the rotation of the second semi-cylindrical plate 7, so that the garbage on the inner wall of the second semi-cylindrical plate 7 and the outer wall of the first semi-cylindrical plate 5 will not be attached under the impact of water flow.

Further, a driving assembly is provided for driving the second semi-cylindrical plate 7 to rotate, and the driving assembly includes a mounting frame 9 fixedly connected to the outer wall of the water collecting pool 1; a driving motor 10 is fixedly connected in the mounting frame 9; an output shaft of the driving motor 10 is fixedly connected with the driving gear 11; two ends of the mounting shaft 6 are fixedly connected with driven gears 12; the driving gear 11 meshes with the driven gears 12. The driving motor 10 drives the driving gear 11 to rotate, and the driving gear 11 drives the driven gear 12 to rotate, thus driving the mounting shaft 6 to rotate and driving the second semi-cylindrical plate 7 to rotate.

Figure 3:
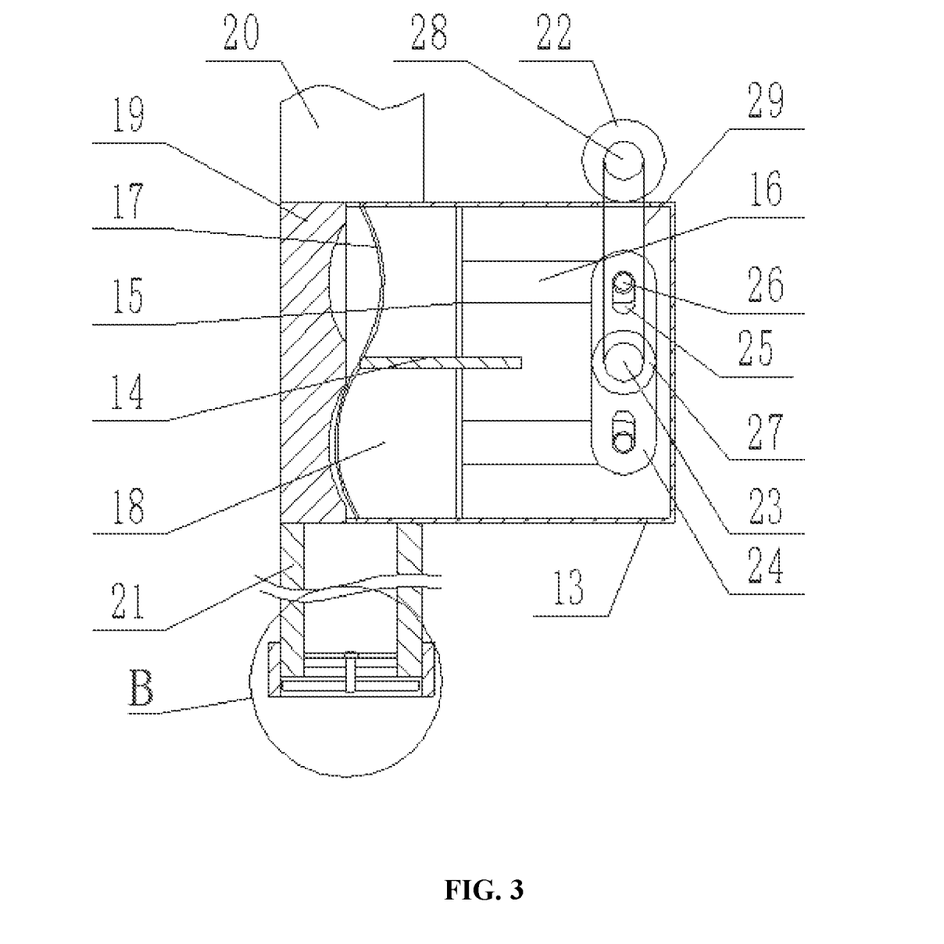
FIG. 3 is a schematic diagram of the pumping mechanism shown in some embodiments of this disclosure.

Further, in order to pump the upper clear water in the water purifying pool 2 into the clean water pool 3 for utilization, a water pumping mechanism is provided; the water pumping mechanism includes an mounting box 13 fixedly connected to the inner wall of the water purifying pool 2; a driving part is arranged in the mounting box 13; a partition 14 in horizontal direction is fixedly connected to one side of the mounting box 13 away from the driving part; the partition 14 divides the mounting box 13 into two slideways, and the two slideways are both slidably connected with a push plate 15; one side of the two push plates 15 is fixedly connected with a push rod 16, and the push rod 16 is in transmission connection with the driving part; two elastic membranes 17 are arranged in the mounting box 13 at the side far away from the driving part; the two elastic membranes 17 are fixedly connected with the inner wall of the mounting box 13 and the side wall of the partition 14 at the side far away from the driving part. A closed compression chamber 18 is formed between the elastic membrane 17 and the partition 14; one side of the mounting box 13 close to the elastic membrane 17 is fixedly connected with a stopper 19; a gap between the elastic membrane 17 and the stopper 19 is set; the top and bottom of the mounting box 13 near the stopper 19 are respectively provided with a water outlet and a water inlet; the top and bottom of that out wall of the mounting box 13 are fixedly connected with a water outlet pipe 20 and a water inlet pipe 21 respectively; and the water outlet pipe 20 and the water inlet pipe 21 are respectively communicated with the water outlet and the water inlet.

The driving part drives the two push plates 15 to move; the two push plates 15 move in opposite directions, (i.e. when one push plate 15 moves forward, the other push plate 15 moves in the opposite direction); the movement of the push plate 15 makes the volume of the closed compression chamber 18 change, and the volume change leads to the pressure change; the pressure change drives the elastic membrane 17 to agitate along the sliding direction of the push plate 15, and the two elastic membranes 17 agitate in different directions. When the elastic membrane 17 close to the water inlet is far away from the stopper 19, negative pressure is formed, which pumps up the water in the purified pool and then move in the direction close to the stopper 19; the other elastic membrane 17 moves away from the stopper 19, pumping the water pumped by the elastic membrane 17 near the water inlet to the water outlet, and then entering the clean water pool 3 from the water outlet pipe 20. Meanwhile, in order to increase the rebound distance of the elastic membrane 17, the side of the stopper 19 close to the elastic membrane 17 is provided with a groove, and the groove is arranged corresponding to the elastic membrane 17. The water in the water purifying pool 2 is pumped into the clean water pool 3 by the agitation of the elastic membrane 17, which may prevent the bottom sludge in the water purifying pool 2 from entering the clean water pool 3 due to the agitation of the water in the water purifying pool 2 by the conventional water pump.

Further, in order to drive the push plate 15 to slide, and at the same time make the two elastic films 17 agitate in opposite directions, a driving part is provided; the driving part includes a reciprocating motor 22 fixedly connected to the top of the outer wall of the mounting box 13; the mounting box 13 is fixedly connected with a stepped shaft 23, and the stepped shaft 23 is rotatably connected with the middle part of a mounting plate 24; long holes 25 are formed at the top and bottom of the mounting plate 24; one end of the push rod 16 far away from the push plate 15 is fixedly connected with a connecting rod 26; the connecting rod 26 is slidably connected in the long hole 25; a first sprocket 27 is rotatably connected to the shaft 23; the output shaft of the reciprocating motor 22 is fixedly connected with a second sprocket 28; the first sprocket 27 and the second sprocket 28 are in transmission connected through a chain 29; the sidewall of the first sprocket 27 is fixedly connected with the sidewall of the mounting plate 24.

The reciprocating motor 22 drives the first sprocket 27 to rotate through the second sprocket 28 and the chain 29. The rotation of the first sprocket 27 drives the mounting plate 24 to rotate, and the rotation of the mounting plate 24 drives the two push rods 16 to move. The long hole 25 prevents the push rods 16 and the mounting plate 24 from interfering with each other when they form a triangular structure during rotation.

Figure 6:
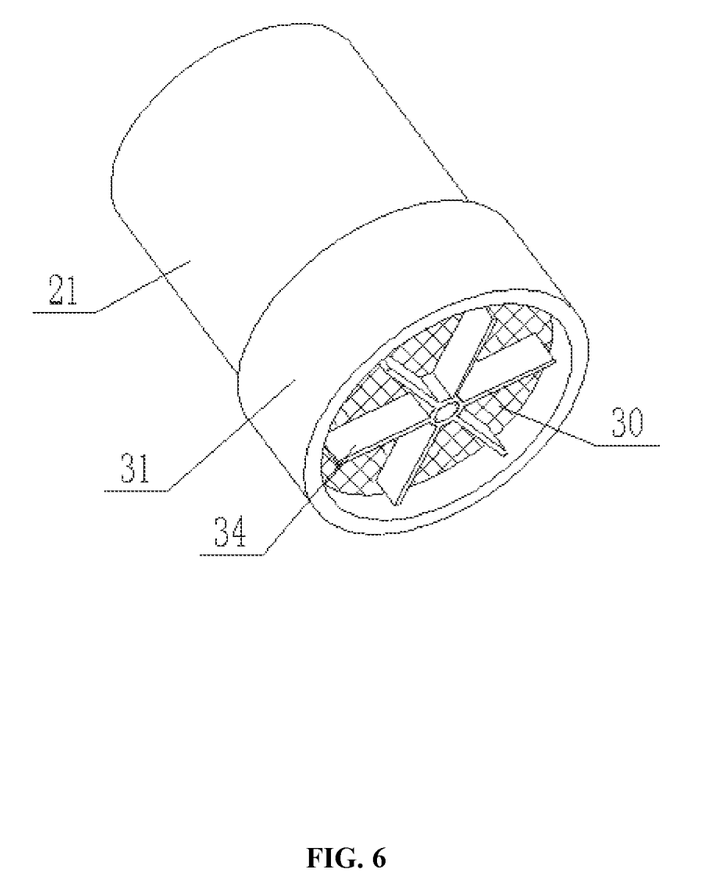
FIG. 6 is a schematic structural diagram of a water inlet pipe shown in some embodiments of this disclosure.

Further, in order to prevent algae and other substances in the water purifying pool 2 from entering the clean water pool 3, a filter screen 30 is detachably connected to the inner wall of one end of the water inlet pipe 21 away from the mounting box 13, and a cleaning assembly is arranged at one end of the water inlet pipe 21 close to the filter screen 30, and the cleaning assembly is correspondingly arranged with the filter screen 30.

Figure 7:
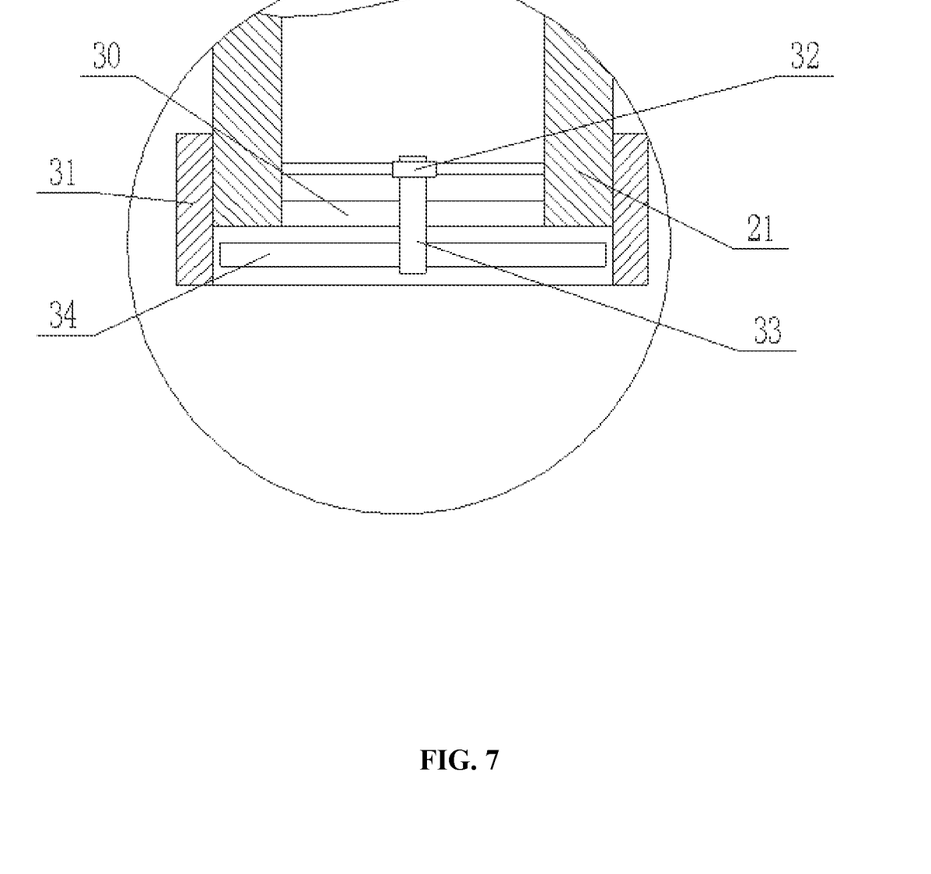
FIG. 7 is an enlarged view of B in FIG. 3.

Further, in order to avoid the clogging of the filter screen 30 during the water pumping process, a cleaning assembly is provided; the cleaning assembly includes a sleeve 31 with one end sleeved on the water inlet pipe 21; the inner wall of the inlet pipe 21 near one end of the filter screen 30 is circumferentially fixedly connected with one end of a plurality of support rods; the other end of the support rod is fixedly connected with the outer wall of the bearing 32; the inner wall of the bearing 32 is fixedly connected with one end of the fixing rod 33; the fixing rod 33 is coaxially arranged with the water inlet pipe 21; the other end of the fixing rod 33 penetrates through the filter screen 30 and extends out of the water inlet pipe 21; one end of the fixing rod 33 extending out of the filter screen 30 is fixedly connected with an impeller 34; the impeller 34 is provided with a gap with the inner wall of the sleeve 31. When the water is pumped into the water inlet pipe 21 by the water pumping mechanism, the water drives the impeller 34 to rotate, and the impeller 34 rotates to scrape off the substances attached to the filter screen 30, so as to ensure the water to pass through.

Further, in order to facilitate to remove the garbage in the water collecting pool 1, an orifice plate 35 is slidably connected in the water collecting pool 1; the bottom of the orifice plate 35 is fixedly connected with the output end of the hydraulic telescopic rod 36; the fixed end of the hydraulic telescopic rod 36 is fixedly connected with the bottom of the water collecting pool 1; a gap is provided between the top surface of the orifice plate 35 and the outer wall of the second semi-cylindrical plate 7. The garbage filtered in the water collecting pool 1 is pushed out of the water collecting pool 1 through the orifice plate 35, which is convenient for cleaning the water collecting pool 1.

Further, in order to facilitate the orifice plate 35 to slide in the water collecting pool 1, two opposite side walls of the water collecting pool 1 are provided with slide rails 37, and the orifice plate 35 is slidably connected in the water collecting pool 1 through the slide rails 37.

When some embodiments of this disclosure are implemented, farmland tail water is collected by the water collecting pool 1, and there are a lot of suspended garbage in the collected tail water. The motor 10 drives the second semi-cylindrical plate 7 to rotate, so that a cylindrical shape is formed between the second semi-cylindrical plate 7 and the first semi-cylindrical plate 5; the fertilizer water received in the water collecting pool 1 flows out into the water purifying pool 2 through the through holes 8 on the second semi-cylindrical plate 7 and the first semi-cylindrical plate 5; after biological purification, the water in the water purifying pool 2 is pumped into the clean water pool 3 by a pumping mechanism. After fermentation, the bottom sludge containing a large amount of nitrogen and phosphorus elements may be refilled to the farmland to supplement agricultural fertilizer nutrients.

In some embodiments, the water purifying pool 2 may include a first treatment pool and a second treatment tank. In some embodiments, the first treatment pool may be an anaerobic pool and the second treatment pool may be an aerobic tank.

Anaerobic pool refers to a pool where anaerobic microorganisms anaerobic fermentation is carried out on the anaerobic microorganisms to purify tail water.

Aerobic pool refers to the pool where aerobic heterotrophic microorganisms oxidize and decompose organic matters to achieve the objective of tail water purification.

The first treatment pool may refer to the pool that first purifies the tail water. In some embodiments, the first treatment pool may receive water from the water collecting pool 1; after the first treatment pool performs anaerobic treatment on the water from the water collecting pool 1, the water is discharged to the second treatment pool. The second treatment pool may refer to the pool that purifies the tail water treated by the first treatment pool. In some embodiments, the second treatment pool may receive the water from the first treatment pool, and the second treatment pool performs aerobic treatment on the water from the first treatment pool, and then the water is discharged to the clean water pool 3.

In some embodiments of this disclosure, by dividing the water purifying pool into the first treatment pool and the second treatment pool, anaerobic treatment and aerobic treatment may be carried out in separate pools, so that the water purification treatment is more sufficient and the tail water purification effect is improved.

In some embodiments, the recycling purification and reuse system for farmland tail water may include a controller. The controller may be used to determine the target illumination distribution matrix, and based on the target illumination distribution matrix, control the recycling purification and reuse system to make corresponding adjustments in the corresponding time period.

The illumination distribution matrix is used to describe the illumination distribution of the first treatment pool and the second treatment pool within different time periods in the tail water purification process of the recycling purification and reuse system. The illumination distribution includes the amount of illumination used for irradiation and the amount of illumination used for heating. The amount of illumination used for irradiation refers to the amount of sunlight injected into the treatment pool. The amount of sunlight used for heating refers to the amount of sunlight shining on the solar heating device and heating the treatment pool.

Each row in the illumination distribution matrix represents the illumination distribution vector of the future time period corresponding to the row. Each illumination distribution vector contains four elements, which are expressed in turn: the amount of illumination for irradiation and the amount of illumination for heating in the first treatment pool, the amount of illumination for irradiation and the amount of illumination for heating in the second treatment pool. Each illumination distribution vector satisfies the constraint conditions of the corresponding time period. Constraints are exemplary, and the following is an illumination distribution matrix:

$$\begin{pmatrix} a_1 & b_1 & c_1 & d_1 \\ a_2 & b_2 & c_2 & d_2 \\ \ldots & \ldots & \ldots & \ldots \\ a_n & b_n & c_n & d_n \end{pmatrix},$$

where the i-th (i=1, 2, . . . , n) row of the matrix represents the illumination distribution vector of the future time period i, and the elements $a_i$, $b_i$, $c_i$ and $d_i$ in this vector respectively represent the amount of illumination for irradiation, the amount of illumination for heating of the first treatment pool, the amount of illumination for irradiation and the amount of illumination for heating of the second treatment pool in the future time period i, which satisfies the following constraints:

$$a_i+b_i+c_i+d_i=T_i,$$

where $T_i$ is the total amount of illumination in the future time period i. The total amount of illumination of each future time period may be based on the current area and the day and night information (such as day or night) and weather information (such as weather forecast) of the future time period.

In some embodiments, the future time period corresponding to each illumination distribution vector in the illumination distribution matrix may be preset. For example, starting from the current moment, each hour in the next three days may be determined as a future time period and arranged in order in the illumination distribution matrix. Exemplary, the future time period corresponding to the first row of the illumination distribution matrix is from the current time to the next hour, and the future time period corresponding to the second row of the illumination distribution matrix is from the next hour to the next two hours, and so on.

The target illumination distribution matrix refers to the illumination distribution matrix with the highest purification efficiency of tail water.

Tail water purification efficiency may be used to describe the purification efficiency of recycling purification and reuse system. In some embodiments, the tail water purification efficiency may be determined based on the number of days of discharging from the first treatment tank, the number of days of discharging from the second treatment pool, and the difference of days of discharging.

The number of days of discharging refers to the number of days that have passed since water entered the treatment pool and was started purification treatment to finish purification treatment and discharged. The difference of days of discharging refers to the absolute value of the difference between the days of discharging of the first treatment pool and the days of discharging of the second treatment pool.

Exemplarily, the tail water purification efficiency may be determined by the following formula:

$$e = \frac{k_1}{t_1} + \frac{k_2}{t_2} - k_3 \Delta t,$$

where e is the tail water purification efficiency, $t_1$ is the number of days of discharging of the first treatment pool, $t_2$ is the number of days of discharging of the second treatment pool, $\Delta t$ is the difference of days of discharging, and $k_1$, $k_2$, and $k_3$ are preset parameters. $k_1$, $k_2$, and $k_3$ may be determined based on experience. For example, $k_1$, $k_2$, and $k_3$ may all be 1.

In some embodiments, the controller may obtain a plurality of preset (for example, based on experience) candidate illumination distribution matrices, sequentially input each candidate illumination distribution matrix into the prediction model, obtain the predicted tail water purification efficiency corresponding to each candidate illumination distribution matrix, and determine the candidate illumination distribution matrix with the highest tail water purification efficiency as the target candidate illumination distribution matrix.

The prediction model may be used to determine the tail water purification efficiency corresponding to the illumination distribution matrix. In some embodiments, the prediction model may be a machine learning model. For example, the prediction model may be a deep neural network.

The input of the prediction model may include illumination distribution matrix, and the output of the prediction model may include tail water purification efficiency.

In some embodiments, the prediction model may be obtained through training. For example, the training samples may be input into the initial prediction model to build a loss function based on the output of the initial prediction model, and the parameters of the initial prediction model may be iteratively updated based on the loss function until the preset conditions are met and the training is completed.

In some embodiments, the training sample may include the illumination distribution matrix corresponding to the historical tail water purification; labels are the tail water purification efficiency corresponding to the historical tail water purification. Training samples and labels may be obtained based on historical data.

In some embodiments, based on the target illumination distribution matrix, the controller may control the recycling system to make corresponding adjustments to meet the illumination distribution requirements. For example, the controller may adjust (e.g., adjust the angle) the reflective plates located above the first and second treatment pools to reflect part of sunlight to another pool or the solar heating plate of this pool/another pool, so as to realize the illumination distribution required by the illumination distribution vector of the corresponding time period in the target illumination distribution matrix.

In some embodiments, the controller may determine the target illumination distribution matrix based on genetic algorithm. For more information about determining the target illumination distribution matrix based on genetic algorithm, please refer to FIG. 9 and its related description.

In some embodiments of this disclosure, by distributing different amounts of illumination for irradiation and heating to the first and second treatment pools, the amounts of illumination and temperatures of the first and second treatment pools may be adjusted respectively, so as to obtain the environment required by microorganisms in different pools during tail water purification; the target illumination distribution matrix is determined from several candidate illumination distribution matrices based on the prediction model, and the recycling purification and reuse system is adjusted accordingly based on the target illumination distribution matrix, which may improve the purification efficiency of tail water.

Figure 9:
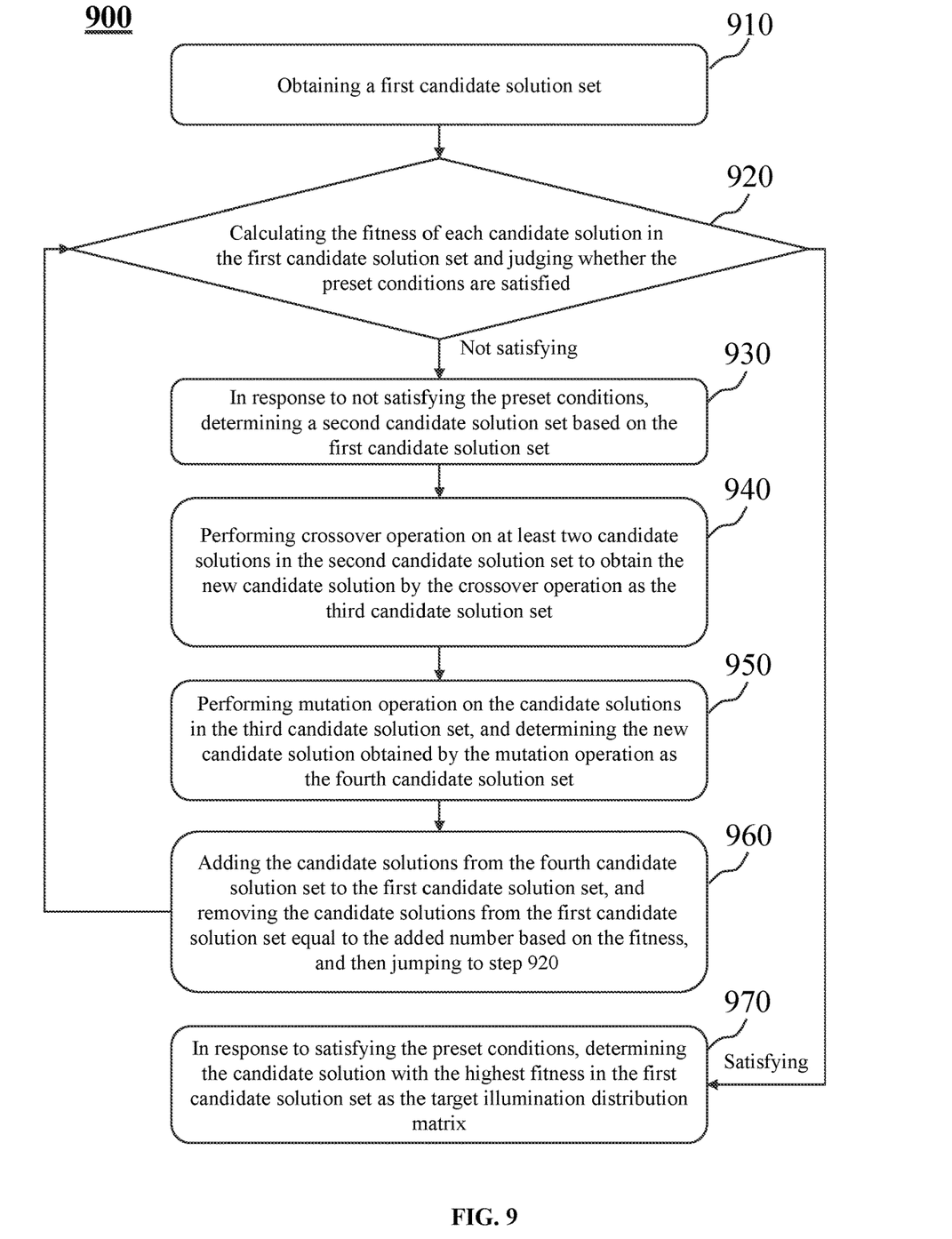
FIG. 9 is an exemplary flowchart of determining a target illumination distribution matrix based on genetic algorithm shown in some embodiments of this disclosure.

FIG. 9 is an exemplary flowchart of determining target environmental parameters based on genetic algorithm according to some embodiments of the present disclosure. In some embodiments, the process 900 may be executed by a controller in the recycling purification and reuse system. As shown in FIG. 9, the process 900 includes the following steps:

Step 910, obtaining a first candidate solution set.

The candidate solution refers to the illumination distribution matrix. The first candidate solution set refers to the set of candidate solutions satisfying the constraint conditions. The controller may generate a plurality of candidate solutions by random generation or other methods and determine the candidate solutions satisfying the constraint conditions as the first candidate solution set. For more information about constraints, please refer to the related descriptions in other parts of this disclosure.

Step 920: calculating the fitness of each candidate solution in the first candidate solution set and judging whether the preset conditions are satisfied.

Fitness may be used to describe the quality of candidate solutions. In some embodiments, the fitness of the candidate solution may be the tail water purification efficiency corresponding to the candidate solution. The tail water purification efficiency may be obtained based on the prediction model. For more information about tail water purification efficiency and prediction model, please refer to the related descriptions in other parts of this disclosure.

The preset conditions may be preset based on experience. For example, the preset condition may be that the fitness of a candidate solution is greater than a preset threshold. For example, the preset condition may be that the number of times this step has been performed is greater than a preset threshold.

Step 930, in response to not satisfying the preset conditions, determining a second candidate solution set based on the first candidate solution set.

The second candidate solution set refers to the candidate solution set satisfying certain conditions in the first candidate solution set. In some embodiments, the controller may determine the second candidate solution set by a selection function based on the first candidate solution set. The selection function may be used to add each candidate solution in the first candidate solution set to the second candidate solution set with a certain selection probability. In some embodiments, the selection function may be designed based on roulette wheel selection, random competitive selection, best reserved selection, random selection without playback, uniform ordering, random league selection, etc.

Step 940: performing crossover operation on at least two candidate solutions in the second candidate solution set to obtain the new candidate solution by the crossover operation as the third candidate solution set.

The third candidate solution set refers to a set of new candidate solutions obtained by performing crossover operation at least two candidate solutions in the second candidate solution set. Crossover operation refers to the operation of two candidate solutions to obtain a new candidate solution. In some embodiments, the crossover operation may be as follows: two candidate solutions are selected, the rows to be crossed are determined based on the crossover probability, and then the rows to be crossed of the two candidate solutions are exchanged. The crossover probability may be preset based on experience, for example, the crossover probability may be 0.5.

Exemplarily, an example of crossover operation between two candidate solutions is as follows. The following are two candidate solutions A and B:

$$A = \begin{pmatrix} a_1 & b_1 & c_1 & d_1 \\ a_2 & b_2 & c_2 & d_2 \\ \cdots & \cdots & \cdots & \cdots \\ a_n & b_n & c_n & d_n \end{pmatrix}$$

$$B = \begin{pmatrix} a'_1 & b'_1 & c'_1 & d'_1 \\ a'_2 & b'_2 & c'_2 & d'_2 \\ \cdots & \cdots & \cdots & \cdots \\ a'_n & b'_n & c'_n & d'_n \end{pmatrix},$$

For each row, it is determined whether the row is exchanged with each other based on the crossover probability. For example, based on the crossover probability, only the first row needs to be exchanged with each other, and the rest of the rows don't need to be exchanged with each other. After the crossover operation is performed, the following two new candidate solution C and D may be obtained:

$$C = \begin{pmatrix} a'_1 & b'_1 & c'_1 & d'_1 \\ a_2 & b_2 & c_2 & d_2 \\ \cdots & \cdots & \cdots & \cdots \\ a_n & b_n & c_n & d_n \end{pmatrix},$$

$$D = \begin{pmatrix} a_1 & b_1 & c_1 & d_1 \\ a'_2 & b'_2 & c'_2 & d'_2 \\ \cdots & \cdots & \cdots & \cdots \\ a'_n & b'_n & c'_n & d'_n \end{pmatrix},$$

Step 950, performing mutation operation on the candidate solutions in the third candidate solution set, and determining the new candidate solution obtained by the mutation operation as the fourth candidate solution set.

The fourth candidate solution set refers to a set of new candidate solutions obtained by mutating the candidate solutions in the third candidate solution set. Mutation operation refers to the operation of calculating a single candidate solution to obtain a new candidate solution. In some embodiments, the mutation operation may be as follows: selecting a single candidate solution, determining the rows to be mutated based on the mutation probability, and for each row to be mutated, generating four numbers by random generation or other methods, and adding them to the elements of the row respectively. In which, for each line to be mutated, the sum of the generated four numbers is 0. The mutation probability may be preset based on experience, for example, the mutation probability may be 0.05.

Exemplarily, if the above candidate solution C is mutated, assuming that only the first row needs to be mutated based on the mutation probability, and four random numbers with the sum of 0 are randomly generated, such as 0.75, –0.25, 0.1 and 0.6, the following new candidate solution may be obtained after the mutation operation of C:

$$E = \begin{pmatrix} a'_1 + 0.175 & b'_1 - 0.25 & c'_1 + 1.0 & d'_1 + 0.6 \\ a_2 & b_2 & c_2 & d_2 \\ \cdots & \cdots & \cdots & \cdots \\ a_n & b_n & c_n & d_n \end{pmatrix},$$

Step 960, adding the candidate solutions from the fourth candidate solution set to the first candidate solution set, and removing the candidate solutions from the first candidate solution set equal to the added number based on the fitness, and then jumping to step 920.

In some embodiments, when the candidate solutions are removed from the first candidate solution set, the numerical value may be sorted based on the fitness, and the candidate solutions with the lowest fitness are removed in turn until the required number of removed solution is reached.

Step 970, in response to satisfying the preset conditions, determining the candidate solution with the highest fitness in the first candidate solution set as the target illumination distribution matrix.

In some embodiments of this disclosure, the target illumination distribution matrix is determined based on genetic algorithm, which may quickly obtain a better optimization result in a huge solution space, so that the tail water purification efficiency of the obtained target illumination distribution matrix is higher.

In the description of the disclosure, it should be understood that the terms "longitudinal", "transverse", "upper", "lower", "front", "rear", "left", "right", "vertical", "horizontal", "top", "bottom", "inner", "outer", etc. and other directions or positional relationships are based on the orientation or positional relationship shown in the drawings are only for the convenience of describing the disclosure, rather than indicating or implying that the device or element referred to must have a specific orientation, be configured and operated in a specific orientation, and therefore cannot be understood as a limitation to the disclosure.

The above-mentioned embodiments are only to describe the preferred mode of this disclosure, and do not limit the scope of this disclosure. Without departing from the design spirit of this disclosure, those of ordinary skill in the art may make various modifications to the technical solutions of this disclosure. Deformations and improvements should fall within the scope of protection determined by the claims in this disclosure.

The invention claimed is:

1. A recycling purification and reuse system for farmland tail water, comprising a water collecting pool, a water purifying pool, and a dean water pool, wherein the water purifying pool is correspondingly arranged with the dean water pool; the water collecting pool is located above a side of the water purifying pool with a distance from the clean water pool; one side of the water collecting pool adjacent to the water purifying pool is provided with an opening; a filtering mechanism is arranged on the opening, the filtering mechanism is correspondingly arranged with the water purifying pool; a water pumping mechanism is arranged in the water purifying pool; and the water outlet end of the water pumping mechanism is correspondingly arranged with the dean water pool; and the filtering mechanism comprises mounting blocks fixedly connected to two side walls of the opening; a first semi-cylindrical plate is arranged between the two mounting blocks; two sides of the first semi-cylindrical plate are fixedly connected with two mounting blocks respectively; a mounting shaft is rotatably connected between the two mounting blocks; the mounting shaft is coaxially arranged with the first semi-cylindrical plate, and the first semi-cylindrical plate is rotationally connected with the mounting shaft; the mounting shaft is fixedly connected with a second semi-cylindrical plate; the second semi-cylindrical plate is coaxially arranged with the mounting shaft; an outer wall of the second semi-cylindrical plate is in sliding fit with an inner wall of the first semi-cylindrical plate; side walls of the first semi-cylindrical plate and the second semi-cylindrical plate are both provided with a plurality of rows of through holes along an axial direction; two ends of the mounting shaft penetrate through the mounting blocks and a side wall of the water collecting pool and extend out of the water collecting pool; an outer side wall of that water collecting pool is provided with a driving assembly; and the driving assembly is matched with the mounting shaft in a transmission way.

2. The recycling purification and reuse system for farmland tail water according to claim 1, wherein the driving assembly comprises a mounting frame fixedly connected with an outer wall of the water collecting pool; a driving motor is fixedly connected in the mounting frame; an output shaft of the driving motor is fixedly connected with a driving gear; both ends of the mounting shaft are fixedly connected with driven gears; and the driving gear is meshed with the driven gears.

3. The recycling purification and reuse system for farmland tail water according to claim 1, wherein the water pumping mechanism comprises a mounting box fixedly connected to an inner wall of the water purifying pool; a driving part is arranged in the mounting box; a partition in horizontal direction is fixedly connected to one side of the mounting box with a distance from the driving part; the partition divides the mounting box into two slideways; a push plate is slidably connected in the two slideways; one side of the two push plates is fixedly connected with a push rod; the push rod is in transmission connection with the driving part; two elastic membranes are arranged in the mounting box at one side away from the driving part; the two elastic membranes are respectively fixedly connected with an inner wall of the mounting box and a side wall of the partition with a distance from the driving part; a closed compression chamber is formed between the elastic membrane and the partition; one side of the mounting box adjacent to the elastic membrane is fixedly connected with a stopper; a gap is arranged between the elastic membrane and the stopper; top and bottom parts of the mounting box near the stopper are respectively provided with a water outlet and a water inlet; top and bottom ends of the outer wall of the mounting box are respectively and fixedly connected with a water outlet pipe and a water inlet pipe; and the water outlet pipe and the water inlet pipe are respectively communicated with the water outlet and the water inlet.

4. The recycling purification and reuse system for farmland tail water according to claim 3, wherein the driving part comprises a reciprocating motor fixedly connected to a top part of the outer wall of the mounting box; a stepped shaft is fixedly connected in the mounting box; a middle part of a mounting plate is rotatably connected to the stepped shaft; the top and bottom ends of the mounting plate are provided with long holes; one end of the push rod with a distance from the push plate is fixedly connected with a connecting rod; the connecting rod is slidably connected in the long hole; the stepped shaft is rotatably connected with a first sprocket; an output shaft of the reciprocating motor is fixedly connected with a second sprocket; the first sprocket and the second sprocket are in transmission connection through a chain; and a side wall of the first sprocket is fixedly connected with a side wall of the mounting plate.

5. The recycling purification and reuse system for farmland tail water according to claim 3, wherein an inner wall of one end of the water inlet pipe with a distance from the mounting box is detachably connected with a filter screen; one end of the water inlet pipe adjacent to the filter screen is provided with a cleaning assembly; and the cleaning assembly is correspondingly arranged with the filter screen.

6. The recycling purification and reuse system for farmland tail water according to claim 5, wherein the cleaning assembly comprises a sleeve with one end sleeved on the water inlet pipe; an inner wall of the water inlet pipe adjacent to one end of the filter screen is circumferentially and fixedly connected with one end of a plurality of support rods; other end of the support rod is fixedly connected with an outer wall of a bearing; an inner wall of the bearing is fixedly connected with one end of a fixing rod; the fixing rod is coaxially arranged with the water inlet pipe; other end of the fixing rod penetrates through the filter screen and extends out of the water inlet pipe; one end of the fixing rod extending out of the filter screen is fixedly connected with an impeller; and the impeller is spaced from an inner wall of the sleeve.

7. The recycling purification and reuse system for farmland tail water according to claim 1, wherein an orifice plate is slidably connected in the water collecting pool; a bottom of the orifice plate is fixedly connected with an output end of a hydraulic telescopic rod; a fixed end of the hydraulic telescopic rod is fixedly connected with a bottom of the water collecting pool; and a gap is arranged between a top surface of the orifice plate and an outer wall of the second semi-cylindrical plate.

8. The recycling purification and reuse system for farmland tail water according to claim 7, wherein two opposite side walls of the water collecting pool are provided with slide rails; and the orifice plate is slidably connected in the water collecting pool through the slide rails.

* * * * *